US011887003B1

(12) United States Patent
Bopardikar et al.

(10) Patent No.: US 11,887,003 B1
(45) Date of Patent: Jan. 30, 2024

(54) IDENTIFYING CONTRIBUTING TRAINING DATASETS FOR OUTPUTS OF MACHINE LEARNING MODELS

(71) Applicants: Sunil Keshav Bopardikar, Los Altos Hills, CA (US); Nikhil Sunil Bopardikar, Los Altos Hills, CA (US); Rohan Bopardikar, Los Altos Hills, CA (US)

(72) Inventors: Sunil Keshav Bopardikar, Los Altos Hills, CA (US); Nikhil Sunil Bopardikar, Los Altos Hills, CA (US); Rohan Bopardikar, Los Altos Hills, CA (US)

(73) Assignees: Sunil Keshav Bopardikar, Los Altos Hills, CA (US); Nikhil Sunil Bopardikar, Los Altos Hills, CA (US); Rohan Bopardikar, Los Altos Hills, CA (US)

( * ) Notice: Subject to any disclaimer, the term of this patent is extended or adjusted under 35 U.S.C. 154(b) by 1672 days.

(21) Appl. No.: 15/971,932

(22) Filed: May 4, 2018

(51) Int. Cl.
*G06N 3/084* (2023.01)
*G06F 17/16* (2006.01)
*G06N 20/00* (2019.01)

(52) U.S. Cl.
CPC ............ *G06N 3/084* (2013.01); *G06F 17/16* (2013.01); *G06N 20/00* (2019.01)

(58) Field of Classification Search
None
See application file for complete search history.

(56) References Cited

U.S. PATENT DOCUMENTS

| 5,826,249 A * | 10/1998 | Skeirik | G05B 13/027 706/15 |
| 10,452,992 B2 * | 10/2019 | Lee | G06N 20/00 |
| 11,475,310 B1 * | 10/2022 | Teig | G06N 3/084 |

(Continued)

*Primary Examiner* — David J Stoltenberg
(74) *Attorney, Agent, or Firm* — Hickman Becker Bingham Ledesma LLP (57) ABSTRACT

Systems and methods for improving a machine learning model are described. In an embodiment, a computing system stores a plurality of training examples comprising training inputs and training outputs. The computing system generates a machine learning model and training the machine learning model using the plurality of training examples. The computing system receives a particular input for the machine learning system and, using the particular input and the machine learning system, computes a particular output. For each training example of the plurality of training examples, the computing system adjusts a weight of the training example on the machine learning system and computes a relative numerical impact on the particular output for the training example, the relative numerical impact reflecting an importance of each training example on the particular output relative to an importance of the other training examples of the plurality of training examples on the particular output. The server computer generates training example relevance data comprising identifiers of the plurality of training examples and the relative numerical impact values for the plurality of training examples. The server computer stores the training example relevance data in the computing system.

18 Claims, 4 Drawing Sheets

(56) References Cited

U.S. PATENT DOCUMENTS

| | | | |
|---|---|---|---|
| 2014/0029840 A1* | 1/2014 | Jebara | G06K 9/6256 382/159 |
| 2015/0186800 A1* | 7/2015 | Kaplow | G06N 5/04 706/12 |
| 2015/0206066 A1* | 7/2015 | Abu-Mostafa | G06F 18/23213 706/12 |
| 2016/0012330 A1* | 1/2016 | Pescianschi | G06N 3/084 706/25 |
| 2016/0092786 A1* | 3/2016 | Mehanna | G06N 20/00 706/11 |
| 2017/0061330 A1* | 3/2017 | Kurata | G06F 16/3344 |
| 2017/0161640 A1* | 6/2017 | Shamir | G06N 20/00 |
| 2017/0278013 A1* | 9/2017 | Yu | G06N 20/20 |
| 2018/0114113 A1* | 4/2018 | Ghahramani | G06N 3/045 |
| 2019/0034830 A1* | 1/2019 | Burangulov | G06F 16/951 |
| 2019/0102693 A1* | 4/2019 | Yates | G06N 7/01 |
| 2019/0197406 A1* | 6/2019 | Darvish Rouhani | G06N 20/00 |
| 2019/0236482 A1* | 8/2019 | Desjardins | G06N 3/00 |
| 2020/0334537 A1* | 10/2020 | Yao | G06N 3/045 |
| 2020/0380357 A1* | 12/2020 | Yao | G06N 3/08 |

* cited by examiner

IDENTIFYING CONTRIBUTING TRAINING DATASETS FOR OUTPUTS OF MACHINE LEARNING MODELS

FIELD OF THE DISCLOSURE

The technical field of the disclosure generally relates to computer hardware, software, and systems that implement communications between client computing devices and server computers. The technical field of the disclosure also is computer hardware, software, and systems that are programmed or configured to generate, train, and process input data using machine learning models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Artificial intelligence has become a major focus of the software industry, allowing computers to perform intricate actions that were otherwise thought to be impossible without specifically programmed rules or functions. One aspect of artificial intelligence, machine learning, utilizes large amounts of data to generate outputs for new datasets.

Machine learning systems are generally trained on large amounts of data which includes inputs and desired outputs. For instance, image recognition machine learning systems will be trained using a large number of images with corresponding classifications, such as images of cats that are labeled as cats and images of dogs that are labeled as dogs.

Data used to train the machine learning model may be obtained from any of a plurality of sources. For instance, an identifier normalizer may use data generated by a company that manually normalized a large number of identifiers and/or used rule-based logic to normalize the identifiers. Data may also be obtained from outside sources, such as through crowd sourcing of a large number of data providers.

Machine learning models are generally instantiated using random or default values for a series of equations which modify the inputs of the training datasets to generate an output. Using the training data, a computing system will alter the equations in the machine learning model in order to reduce the empirical risk or the average difference between the computed outputs and the preidentified outputs in the training data. In doing so, the computing system is able to generate a machine learning model which identifies patterns or relationships without being explicitly taught the patterns or relationships.

Machine learning models are extremely useful as they allow a computing device to compute results without being specifically programmed with a set of rules for computing said results. While the machine learning model inherently learns patterns or relationships, that learning is generally hidden through the equations and their weights. Thus, the actual patterns or relationships used by the machine learning model to compute results from inputs are generally unavailable to a user of the machine learning model.

The "black box" approach of the machine learning model where the learned relationships of the machine learning model are unavailable to the user can create a large number of problems. First, when the machine learning model computes an incorrect output, the biases that led to the incorrect output cannot be easily determined or fixed. Thus, if a machine learning model used by a car mistakenly identifies a truck as a bridge, an engineer would be unable to determine why the machine learning model produced that output and thus is unable to remove the biases of the model for future computations.

Additionally, where the machine learning model produces outputs that are intended to be used in making difficult and/or regulated decisions, an explanation for those decisions is often needed. For instance, the General Data Protection Regulation (GDPR) in Europe provides a right to an explanation for any decision made by a computing device. With modern machine learning models, an explanation for a decision cannot be provided, thereby limiting their usefulness. Additionally, with decisions such as large purchases, the providing of credit, or rental agreements, an explanation of the output of the machine learning model may be needed to show an absence of bias.

The lack of explanation also makes machine learning models difficult to debug or otherwise fix when data is mislabeled. For instance, when data is crowd sourced or received from untrustworthy locations, the outputs can be mislabeled such as a picture of a cat being labeled as a dog. As machine learning models can use thousands of training datasets, it can be extremely hard to identify mislabeled data. As the actual reasons the machine learning system is computing its outputs are hidden, the computing system is unable to identify the training datasets that are decreasing the accuracy of the machine learning model.

Thus, there is a need for a technique that can be used to generate explanations for the outputs of a machine learning model. Additionally, there is a need for a technique which can be used to debug or otherwise improve machine learning models when the training data includes mislabeled information. In cases where the machine learning model is built on scarce data, there is an additional need for a technique that can fix the machine learning model without removing training datasets.

SUMMARY

The appended claims may serve as a summary of the disclosure.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are disclosed in sections according to the following outline:

1. GENERAL OVERVIEW
2. SYSTEM OVERVIEW
3. COMPUTING RELATIVE EFFECT VALUES
4. IDENTIFYING HIGHEST CONTRIBUTORS
5. MACHINE LEARNING MODEL IMPROVEMENT
6. BENEFITS OF CERTAIN EMBODIMENTS
7. HARDWARE OVERVIEW

1. GENERAL OVERVIEW

Systems and methods for improving the functioning of a computing system running a machine learning model are described herein. According to an embodiment, a server computer stores a plurality of training examples comprising inputs and outputs. The server computer uses the training examples to train a machine learning model. When the server computer receives an input for the machine learning model, the server computer computes an output. For each training example of the plurality of training examples, the server computer adjusts the weight of the training example on the machine learning model, thereby adjusting the effect that the training example has on the output. The server computer then computes a relative numerical impact value for the training example indicating an importance of the training example on the computed output of the machine learning model. The server computer stores training example relevance data comprising the relative numerical impact values for each training example. The training relevance data can be used to identify training examples that were the highest contributors to a particular output, to identify training examples that had negative contributions to an output, and/or to otherwise identify mislabeled, incorrect, or heavily biased training examples for removal from the training examples used to train the machine learning model.

In an embodiment, a method comprises storing, in a computing system, a plurality of training examples comprising training inputs and training outputs; generating a machine learning model and training the machine learning model using the plurality of training examples; receiving a particular input for the machine learning system and, using the particular input and the machine learning system, computing a particular output; for each training example of the plurality of training examples, adjusting a weight of the training example on the machine learning system and computing a relative numerical impact on the particular output for the training example, the relative numerical impact reflecting an importance of each training example on the particular output relative to an importance of the other training examples of the plurality of training examples on the particular output; generating training example relevance data comprising identifiers of the plurality of training examples and the relative numerical impact values for the plurality of training examples; storing the training example relevance data in the computing system.

2. SYSTEM OVERVIEW

Figure 1:
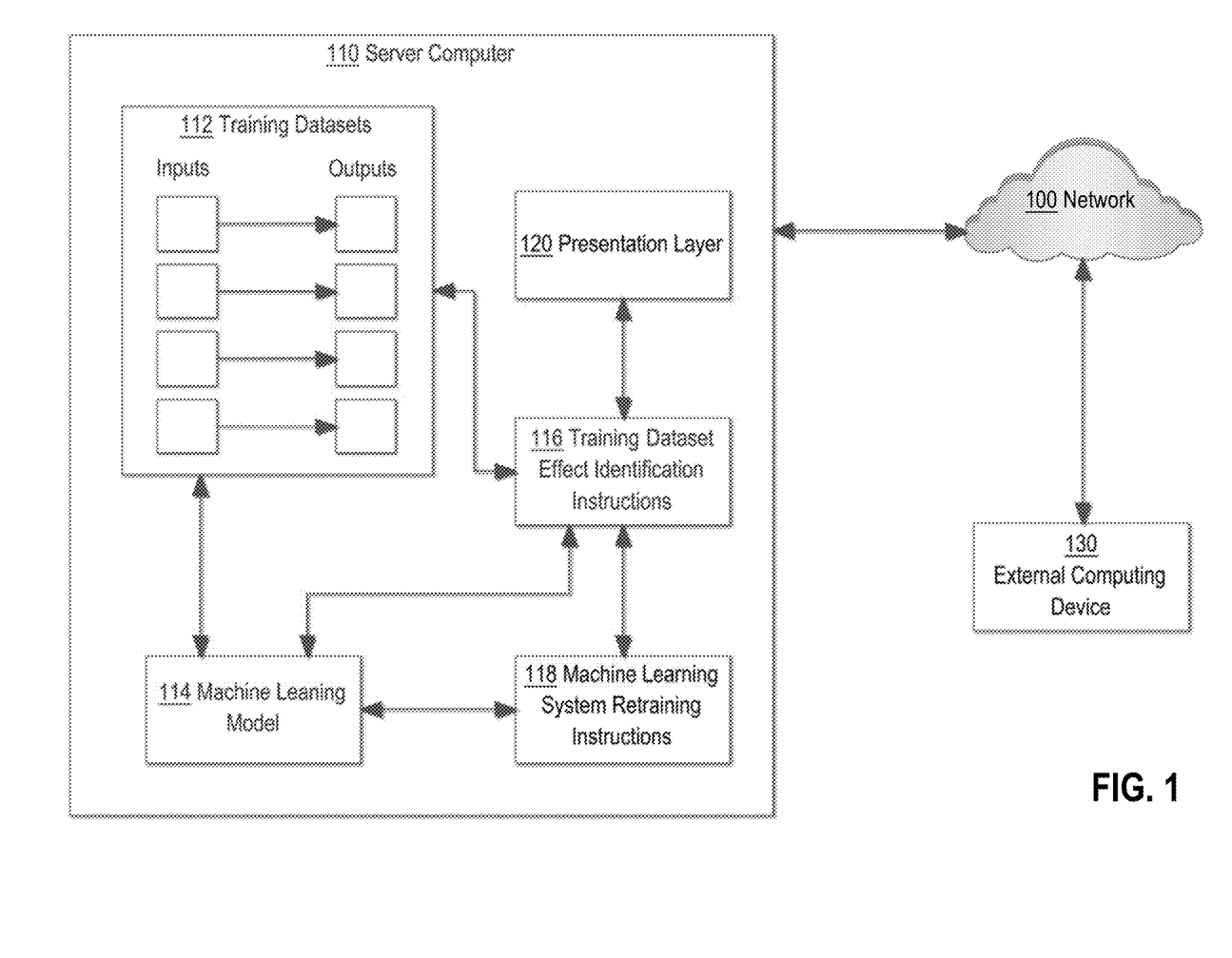
FIG. 1 depicts an example system in which the techniques described may be implemented according to an embodiment.

FIG. 1 depicts an example system in which the techniques described may be implemented according to an embodiment. In the example of FIG. 1, a server computer 110 and an external computing device 130 are communicatively coupled to a data communications network 100. The network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, external computing device 130, and other elements of the system may each comprise an interface compatible with the network 100 and are programmed or configured to use standardized protocols for communication across the networks such as TCP/IP, Bluetooth, and higher-layer protocols such as HTTP, TLS, and the like.

Server computer 110 may be implemented using a server-class computer or other computers having one or more processor cores, co-processors, or other computers. Server computer 110 may be a physical server computer and/or a virtual server instance stored in a data center, such as through cloud computing. The server computer 110 may be programmed or configured to generate and train a machine learning model, such as a neural network. The server computer may comprise a plurality of communicatively coupled server computers including a server computer for training the neural network and a server computer for communicating with a client computing device. According to an embodiment, server computer 110 stores training datasets 110, machine learning system 114, training dataset effect identification instructions, machine learning system retraining instructions, and presentation layer 120.

Training datasets 110 comprise a plurality of training examples for building a machine learning model. Training datasets 110 comprise training inputs and training outputs. The inputs comprise data identifying initial conditions while the outputs comprise intended results of the machine learning model for the inputs. For example, a machine learning model for identifying images as cats or dogs may be built from training datasets with inputs comprising matrices representing pixel locations and/or colors in an image and outputs indicating whether the images are a cat or a dog. Inputs and/or outputs may comprise one or more of matrices, vectors, values, strings, and/or any other data which can be used as inputs and/or outputs in a machine learning model. Each training input corresponds to at least one training output. The corresponding outputs may be manually identified for each input, determined and verified through use of one or more algorithms and/or prior usage of the machine learning model, and/or received from one or more external computing devices.

Server computer 110 uses the training datasets to train a machine learning model 114. The machine learning model 114 may comprise any model for using statistical techniques to progressively improve predictions based on input data. Example machine learning models 114 include decision trees, neural networks, support vector machines, and Bayesian networks. Machine learning model 114 may comprise any model which is trained using training data that comprises inputs and corresponding outputs.

Training the machine learning model generally comprises a feedback loop wherein one or more equations are used to compute an output for an example input of a training example. After producing an output, the produced output is compared to the example output for the training example. If the example output matches the produced output, the neural network proceeds to the next training dataset. If the outputs do not match, then weight values for the equations are adjusted to reduce the difference between the produced output and the corresponding output, such as through stochastic gradient descent. The machine learning model is then used again to produce an output for the example input for the training example. The process continues with the training example until the corresponding output matches the produced output.

Server computer 110 additionally stores training dataset effect identification instructions 116 and machine learning system retraining instructions 118. Training dataset effect identification instructions 116 and machine learning system retraining instructions 118 each comprise a set of one or more pages of main memory, such as RAM, in a server computer into which executable instructions have been loaded and which when executed cause the master neural network server computer to perform the functions or operations that are described herein with reference to those modules. For example, training dataset effect identification instructions 116 may comprise a set of pages in RAM that contain instructions which when executed cause the server computer 110 to perform a method for identifying relative effects of training datasets on computed outputs, such as the example method described in FIG. 2.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, training dataset effect identification instructions 116 and machine learning system retraining instructions 118 also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 110.

Presentation layer 120 may be programmed or configured for generating electronic pages, alerts, notifications, hyperlinks, recommendations, or application protocol messages to output to the computing devices such as the external computing device 130. For example, the presentation layer 120 may be programmed to generate and display graphical user interfaces which identify training datasets for review and/or removal.

External computing device 130 is a computer that includes hardware capable of communicatively coupling external computing device 130 to one or more server computers, such as server computer 110 over one or more networks. For example, external computing device 130 may include a network card that communicates with server computer 110 through a home or office wireless router (not illustrated in FIG. 1) couple to an internet service provider. External computing device 130 may be a smart phone, personal computer, tablet computing device, PDAs, laptop, or any other computing device capable of transmitting and receiving information and performing the functions described herein.

FIG. 1 depicts server computer 110 and external computing device 130 as distinct elements for the purpose of illustrating a clear example. However, in other embodiments, more or fewer server computers may accomplish the functions described herein. For example, a plurality of external computing devices may connect to the server computer 110. Additionally, server computer 110 may comprise a plurality of communicatively coupled server computers including a server computer for training the neural network and a server computer for communicating with an external computing device.

3. COMPUTING RELATIVE EFFECT VALUES

Figure 2:
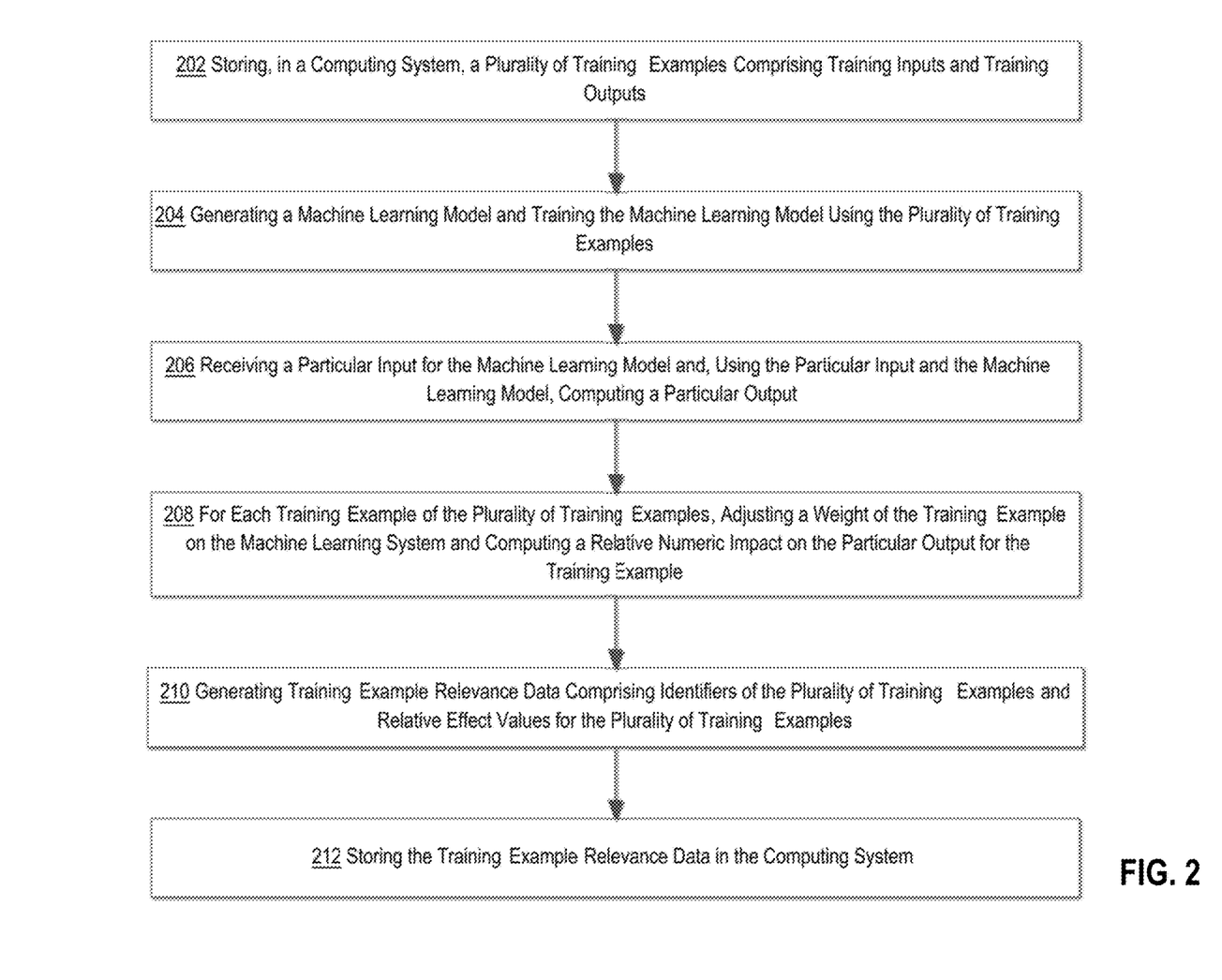
FIG. 2 depicts an example method for generating explanations of a machine learning model.

FIG. 2 depicts an example method for generating explanations of a machine learning model.

At step 202, a plurality of training examples comprising training inputs and training outputs are stored in a computing system. The training inputs comprise one or more values that identify initial conditions and which are paired with training outputs which represent results. For instance, categorizing machine learning models may include inputs of matrices comprising values indicating pixel location and/or color values with outputs that are mapped to categorizations of the images. Inputs may include any of vectors, strings, matrices, or other representations of initial conditions.

Training examples may include any number of inputs or outputs. For example, a machine learning model for determining whether to grant a loan may include inputs of age, credit score, current debt, current pay, categorizations of current employment, and/or other socioeconomic information. Different training examples may include different inputs, depending on available data. For instance, a first training example may include an input of a credit score while a second training example does not.

Training examples may be provided by one or more external computing devices. For example, crowd sourced data may be used to generate training examples, where crowd sourced data refers to data retrieved from a plurality of computing devices with at least one training input and one training output for each example. As another example, a single computing device may aggregate data into a plurality of training examples by specifying portions of the aggregated data as inputs and other portions as corresponding outputs.

At step 204, a machine learning model is generated and trained using the plurality of training examples. For example, the server computer may initialize a machine learning model, such as a neural network, with initial values for the weights of the equations in the machine learning model. The initial values may be determined in advance, such as equivalent weights for each equation, and/or randomized or selected when the machine learning model is formed.

Training of the machine learning model comprises, using the inputs of a first training example, computing an output through the machine learning model. If the computed output matches the corresponding output for the training example, the server computer moves onto the next training example. If the computed output does not match the corresponding output, the server computer adjusts the weights for the equations and recomputes the output. This process continues until the computed output matches the corresponding output. As an example, a neural network may use a weight matrix comprising a plurality of weight values to be multiplied by initial inputs. When the computed output does not match the corresponding output of the training example, the server computer may apply stochastic gradient descent to the weight matrix to adjust the values of the weight matrix over time until the computed output matches the corresponding output. The server computer may then repeat this process for each training example.

At step 206, a particular input for the machine learning model is received and a particular output is computed using the particular input and the machine learning model. For example, after training the machine learning model, the server computer may use the machine learning model to generate an output for a specific input, such as by applying the weighted equations to one or more input values. The particular input may include an example input for purposes of strengthening the machine learning model and/or an input for which an explanation of the output is requested as discussed further herein.

At step 208, for each training example of the plurality of training examples, a weight of the training example on the machine learning system is adjusted and a relative numerical impact on the particular output is computed for the training example. The relative numerical impact reflects an importance of each training example on the particular output relative to an importance of the other training examples of the plurality of training examples on the particular output. For instance, a higher relative numerical impact indicates that the training example was more influential in generating the particular output than a lower relative numerical impact.

In an embodiment, the server computer retrains the machine learning model with the adjusted training examples. For example, the server computer may adjust a first training example by increasing the weight of the loss equation for the machine learning model with respect to the first training example. The server computer may then retrain the machine learning model with the adjusted training example and compute a new output of the adjusted machine learning model using the particular input. The server computer may determine an effect of adjusting the weight of the first training example by comparing the particular output computed with the original machine learning model with the new output computed using the adjusted machine learning model, such as by computing a difference between the two values. The server computer may then repeat this process with each subsequent training example.

As a practical example, a model may be defined with training examples z with inputs x and outputs y such that a single training example is defined by $z_i=(x_i,y_i)$. The model parameters $\theta$ are optimized by minimizing the empirical risk which is the cumulative loss function with respect to each training example. Thus, the initial training of the machine learning model may be performed according to:

$$\hat{\theta} = \mathrm{argmin}\left[\frac{1}{n}\sum_{i=1}^{n} L(z_i, \theta)\right]$$

where $L(z_i, \theta)$ is the loss function for a training example $z_i$ with the model parameters $\theta$. The particular output may be computed using the machine learning model with parameters $\hat{\theta}$ and the particular input.

The server computer may select a first training example and adjust the weight of the first training example. Adjusting the weight may include removing the first training example, adding in a second copy of the first training example when training the machine learning model, and/or increasing the value of the training example on the minimization function. For instance, a magnification term, $\varepsilon$, may be selected to adjust the weight of the first training example. In an embodiment, $\varepsilon$ is a value between zero and one. Using the adjustment term, a new machine learning model may be trained according to:

$$\hat{\theta}_{z,\varepsilon} = \mathrm{argmin}\left[\frac{1}{n}\sum_{i=1}^{n} L(z_i, \theta) + \varepsilon L(z, \theta)\right]$$

where $L(z, \theta)$ is the loss function for the first training example. Using the machine learning model with parameters $\hat{\theta}_{z,\varepsilon}$ and the particular input, the machine learning model may compute a second output. The server computer may compare the second output with the particular output. For example, the server computer may compute a difference between the particular output and the second output and store a difference value for the dataset. The server computer may perform the same steps for a plurality of training examples.

Figure 3:
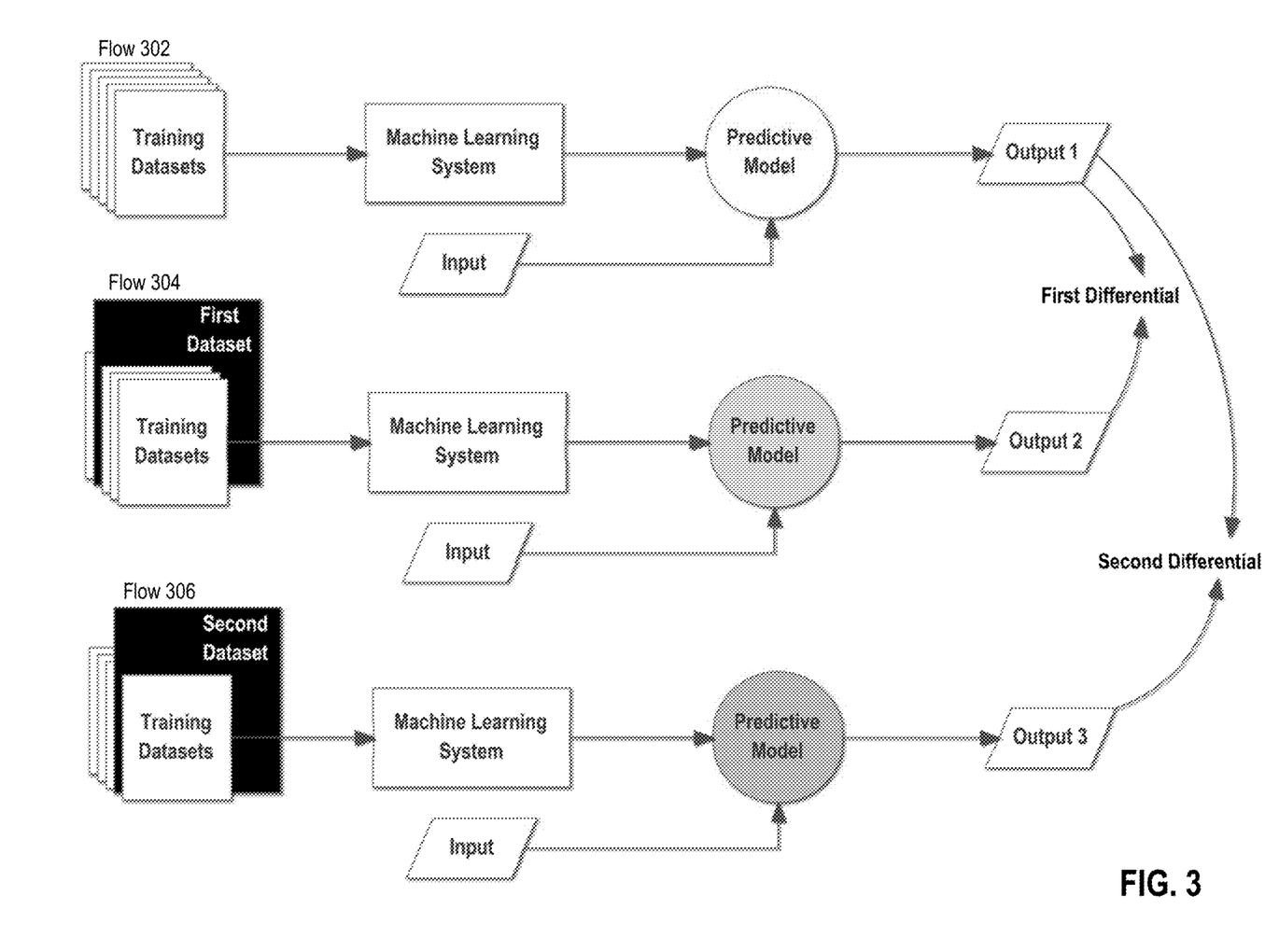
FIG. 3 depicts an example method of computing relative numerical impacts for a plurality of training datasets.

FIG. 3 depicts an example method of computing relative numerical impacts for a plurality of training datasets. In flow 302, a plurality of training datasets is used to train a machine learning system to create a predictive model. Using the predictive model, output 1 is generated from an input. In flow 304, the weight of a first dataset is increased, thereby giving more weight to the inputs and outputs of the first dataset in training the machine learning system. The training datasets including the augmented first dataset are used to train a machine learning system to create a second predictive model. Using the second predictive model, output 2 is generated from the same input used to create output 1. A first differential is computed from output 2 and output 1. Similarly, in flow 306, the weight of a second dataset is increased. The datasets including the augmented second dataset are used to train a machine learning system to create a third predictive model. Using the third predictive model, output 3 is generated from the same input used to create outputs 1 and 2. A second differential is computed from output 3 and output 1.

The methods described herein may be applied to any number of training examples, including a strict subset of the training examples used to train the machine learning model. For example, the machine learning model may be trained using training examples from a plurality of different sources. If a particular source is less trustworthy than others, the server computer may compute relative numerical impacts for the training examples from the particular source. Methods incorporating less than all of the training examples used to train the machine learning model may be useful for creating explanations when likely candidates have been preidentified and/or to perform debugging or model updating as described further herein.

Retraining machine learning models for each training example may be computationally expensive, especially when a large number of training examples are being tested. Reductions in the training and computation time may be generated by training the different machine models in parallel, such that a plurality of machine models are trained at the same time. Additionally and/or alternatively, the server computer may compute the numerical impact values in a manner that incorporates the adjustment of a training example without retraining the machine learning model.

In an embodiment, the server computer computes a change in the loss equation for a particular input and particular output and a particular training example with respect to a change in an adjustment value. An example equation for computing the change in the loss equation with respect to a change in the adjustment value is produced below:

$$\frac{dL(z_{test}, \hat{\theta}_{\varepsilon,z})}{d\varepsilon} = -\nabla_\theta L(z_{test}, \hat{\theta})^T \nabla^2 ER(z, \hat{\theta})^{-1} \nabla_\theta L(z, \hat{\theta})$$

where $z_{test}$ comprises the particular input and the particular output, z comprises the training example, and $ER(z,\hat{\theta})$ comprises the empirical risk computed as:

$$ER(z, \hat{\theta}) = \frac{1}{n}\sum_{i=1}^{n} L(z_i, \theta) + \varepsilon L(z, \theta)$$

The server computer may compute the change in the loss equation with respect to a change in the adjustment value for each of a plurality of training examples and store the results as the relative numerical impacts for each training example. In situations where a derivative of the loss function does not exist, such as in the case of sharp peaks or discontinuous functions, the server computer may approximate the derivative of the loss function using one or more techniques. For example, the server computer may use a smoothing function for sharp peaks or a local approximation of the loss function in situations where there is a lack of convergence or a non-convex loss function. The loss function may include any regularization terms for the machine learning model.

Mathematics software such as TENSORFLOW, commercially available on GITHUB, may be used to compute the gradients of the loss function. As an example, the inverse of the second level gradient of the empirical risk can be computed in linear time using the Linear (time) Stochastic Second-Order Algorithm from Naman Agarwal, et al., *Second-Order Stochastic Optimization for Machine Learning in Linear Time*, arXiv:1602.03943v5 Journal of Machine Learning Research 18(116) (2017), the entire contents of which are incorporated by reference as if fully disclosed herein. The algorithm for computing the inverse of the second level gradient in linear time is reproduced below:

---

Algorithm 1 LiSSA: Linear (time) Stochastic Second-Order Algorithm

Input:
$$T, f(x) = \frac{1}{m}\sum_{k=1}^{m} f_k(x), S_1, S_2, T_1$$

$x_1 = FO(f(x), T_1)$
for t = 1 to T do
  for i = 1 to $S_1$ do
    $X_{[i,0]} = \nabla f(x_t)$
    for j = 1 to $S_2$ do
      Sample $\tilde{\nabla}^2 f_{[i,j]}(x_t)$ uniformly from $\{\nabla^2 f_k(x_t) \mid k \in [m]\}$
      $X_{[i,j]} = \nabla f(x_t) + (I - \tilde{\nabla}^2 f_{[i,j]}(x_t))X_{[i,j-1]}$
    end for
  end for
  $X_t = 1/S_1 \left(\sum_{i=1}^{S_1} X_{[i,S_2]}\right)$
  $x_{t+1} = x_t - X_t$
end for
return $x_{T+1}$

---

For the implementation where a difference between outputs of the machine learning model is used, the server computer may take the absolute value of the differences as part of generating the training example relevance data. In implementations using the change in loss function with respect to a change in the adjustment value, the server computer may not take the absolute value of the computed results. In an embodiment, the relative numerical effect values are normalized to a range of values. For example, the server computer may normalize the relative numerical effect values so that they have a range of zero to ten or negative ten to positive ten, depending on what method is used for creating the relative numerical effect values. A basic normalization method may include dividing each relative numerical effect value by one tenth of the highest relative numerical effect value, thereby maintaining the ordering of values but ensuring that the highest value is set at ten.

At step 210, training example relevance data comprising identifiers of the plurality of training examples and the relative numerical effect values for the plurality of training examples is generated. The training example relevance data may identify the plurality of examples and include the relative numerical effect values computed for the plurality of examples. Additional data, such as a ranking of training examples by relative numerical effect values, identification of one or more top tanked training example, and/or identification of one or more training examples based on similar relative numerical effect values may be stored as well. For instance, the server computer may store data identifying training examples which have a negative relative numerical effect value.

At step 212, the training example relevance data is stored in the computing system. By creating and storing training example relevance data, the server computer is able to perform tasks that were otherwise unfeasible or impossible. For example, training relevance data may be used to identify the causes of a specific output in a machine learning model where explanations of machine learning models were previously unavailable. Additionally, the server computer is able to use the training example relevance data to identify training examples for removing, relabeling, and/or correcting in order to improve the machine learning model. Methods of improving computing systems using the training example relevance data are described further herein.

4. IDENTIFYING HIGHEST CONTRIBUTORS

In an embodiment, the training example relevance data is used to determine the highest contributors to a machine learning model output. For example, a client computing device may request an explanation for an output of a machine learning model, such as when the output is unexpected and/or disputed. In response to the request, the server computer may generate the training example relevance data as described above.

In an embodiment, the server computer identifies a threshold number of training examples as the highest contributors. For example, the server computer may select the five training examples with the highest relative numerical effect values as the highest contributors. Additionally or alternatively, the server computer may select a top percentage of training examples, such as the training examples with the top one percent of relative numerical effect values. Other methods of selecting the highest contributors may involve identifying outliers. For instance, if a relatively small number of training examples have relative numerical effect values greater than nine, but the next highest relative numerical effect values are below five, the server computer may select the training examples with the values above nine. Methods of identifying outliers may include selecting relative numerical effect values that are greater than two or three standard deviations from the mean value and/or above three times the interquartile range from the third quartile of values.

The server computer may cause display of identifiers of the training examples that were selected as being the highest contributors to the model output. For example, each training example may comprise a unique identifier that can be used for lookup of the training example by a client computing device. Additionally or alternatively, the server computer may display the training examples on the client computing device, such as displaying the training inputs and training outputs in each training example. For example, if an output of a machine learning model identified a truck as a bridge, the server computer may display the training examples comprising images that were previously identified as bridges. Thus, the server computer may display both the inputs and outputs that were most relevant to producing the output of the machine learning model.

5. MACHINE LEARNING MODEL IMPROVEMENT

In an embodiment, the training example relevance data is used to strengthen the machine learning model. For example, a client computing device may send a request to the server computer to generate training example relevance data in response to a determination that an output of a machine learning model is incorrect. The server computer may cause display of the identifiers of the training examples that were selected as being the highest contributors to the model output along with one or more options to edit or remove the training examples from the machine learning model. Thus, if the cause of the incorrect output included training examples that were incorrect or mislabeled, such as a picture of a cat that was labeled as a dog, the client computing device may be used to edit the training example by labeling the image as a cat and/or request that the training example be removed from the machine learning model.

In an embodiment, the server computer automatically identifies training examples for removal and/or editing. For example, the server computer may generate an output for a particular input. The particular input may be part of a training example and/or an input used for improving the machine learning model. In implementations where a change in the loss equation with respect to a change in the adjustment value is computed, the server computer may identify training examples which received negative relative numerical impact values. A negative numerical impact value in such cases indicates that the identified training example is negatively responsible for computation of the output. For example, if a server computer correctly identifies an image input as a cat instead of as a dog, then a negative numerical impact value indicates that the training example is counter indicating an output of "cat" for the output which can occur when training examples are mislabeled.

In an embodiment, the server computer identifies training examples with negative relative numerical impact values and sends identifiers of the identified training examples to a client computing device, thereby allowing the training examples to be reviewed for removal. Additionally or alternatively, the server computer may automatically remove any training examples that receive negative relative numerical impact values. The server computer may then retrain the machine learning model without the training examples that received negative relative numerical impact values, thereby pruning the machine learning model of training examples that are negatively impacting the accuracy of the output of the machine learning model. The server computer may employ a hybrid approach, where random training examples of the identified training examples with relative numerical impact values are sent to the client computing device for review while the remaining are removed and/or modified.

In an embodiment, the server computer automatically corrects training examples with negative relative numerical impact values. For example, the server computer may identify the training examples with negative relative numerical impact values. The server computer may switch the output of the identified training examples. For example, if the outputs include options of "cat" or "dog" and the output of an identified training example is "cat," the server computer may switch the output to "dog." The server computer may then retrain the machine learning model with the relabeled outputs. In an embodiment, the server computer recomputes relative numerical impact values for altered training examples to determine whether the relative numerical impact value is still negative. If the relative numerical impact value is still negative, the server computer may remove the training example from the set of training examples used to train the machine learning model. Additionally or alternatively, in the case of a machine learning model with more than two outputs, the server computer may repeat the process for each output until a highest relative numerical impact value is identified for the training example.

In an embodiment, the server computer identifies a correct output for training examples with negative relative numerical impact values by using the machine learning model. For example, the server computer may identify a particular training example with a negative relative numerical impact value. The server computer may use the input of the particular training example and the machine learning model to compute an output. The server may replace the output of the particular training example with the computed output. Thus, the machine learning model is able to correct mislabeled data by utilizing the rest of the machine learning model.

5. BENEFITS OF CERTAIN EMBODIMENTS

The methods described herein improve the usage of machine learning models on a server computer. The ability to provide data identifying the causes of outputs of machine learning models strengthens the reliability of the machine learning models and allows for corrections to be made to machine learning models when incorrect outputs are identified. Explanations for outputs allow machine learning models to be used in a greater number of situations and allows for reduction of unwanted biases in a machine learning model. Additionally, the ability to identify and remove training examples that caused an incorrect output allows for troubleshooting and debugging of machine learning models in a manner that was not previously available as there was no prior method of identifying the causes of a machine learning model's outputs.

The methods described herein additionally improve the server computer's ability to identify relative effects of training examples on a machine learning model. Specifically, training a new machine learning model for each training example can be computationally expensive depending on the number of training examples used. By computing the change in loss with respect to change in adjustment value as described above, each relative numerical impact value may be computed in linear time, thereby highly increasing the speed at which the server computer can produce relative numerical impact values and highly decreasing the processing power required to produce relative numerical impact values.

The methods described herein additionally improve the server computer's ability to automatically correct machine learning models by removing training datasets which negatively correlate to a correct output, such as mislabeled data which may be difficult to identify manually. Additionally, in cases where the training data is sparse, valuable training examples may be preserved by changing the outputs when the training examples have been mislabeled or otherwise misidentify the correct output. Thus, methods of improving machine learning models may maintain the same number of training examples while increasing the accuracy of the machine learning model.

6. HARDWARE OVERVIEW

According to one embodiment, the techniques described herein are implemented by one or more special-purpose computing devices. The special-purpose computing devices may be hardwired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
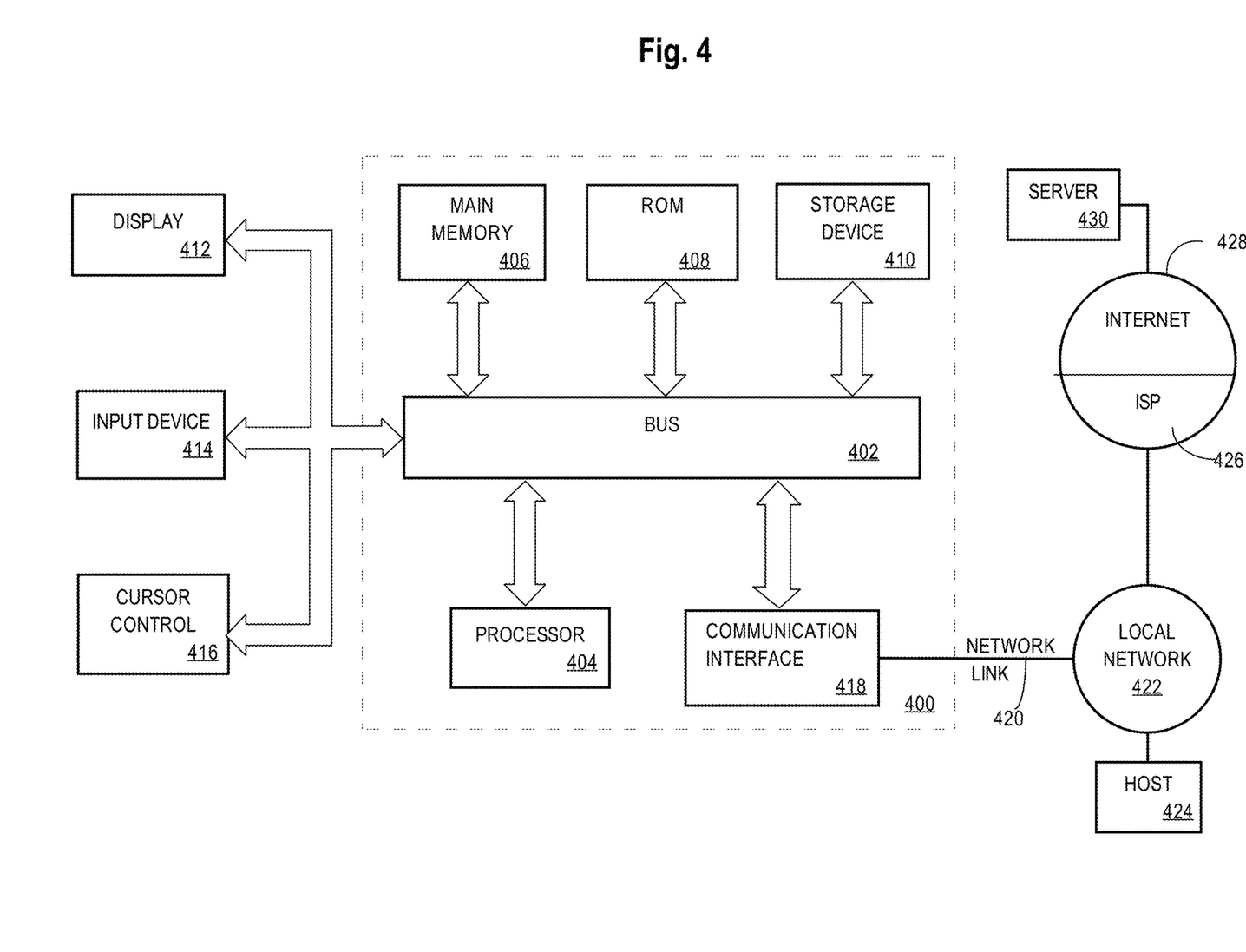
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

As one example implementation, the techniques disclosed herein may be used in a low-power computer comprising a central processing unit; one or more non-transitory digital data storage media coupled to the central processing unit and storing: a trained reduced size deep neural network that has been configured using a server computer, storing a plurality of training datasets, each of which comprising a plurality of training input matrices and a plurality of corresponding outputs; using the server computer, initiating training of a deep neural network using the plurality of training input matrices, a weight matrix, and the plurality of corresponding outputs; while performing the training of the deep neural network, identifying one or more weight values of the weight matrix for removal; removing the one or more weight values from the weight matrix to generate a reduced weight matrix; storing the reduced weight matrix with the deep neural network. The storage media may comprise one or more sequences of instructions which when executed using the central processing unit cause performing: obtaining a digital image from a digital video frame; identifying a face that appears in the digital image; performing a responsive action based on identifying the face that appears in the digital image.

In one aspect, such a low-power computer may further comprising sequences of instructions which when executed cause transmitting a security notification signal as the responsive action. In another aspect, the low-power computer may comprise a computer display output interface; sequences of instructions which when executed cause determining one or more items of demographic data based upon the face that has been identified in the digital image, and selecting and causing displaying a video advertisement based upon the demographic data, as the responsive action, on a computer display device via the computer display output interface.

In yet another aspect, the low-power computer may further comprise sequences of instructions which when executed cause determining an age value and a gender value as the one or more items of demographic data based upon the face that has been identified in the digital image. In various embodiments, the low-power computer may comprise any of a RASPBERRY PI computer, a tablet computer, a computer based on an ARM processor, or a mobile cellular radiotelephone.

In still another aspect, the low-power computer may comprise a video camera that is coupled to the central processing unit to provide the digital video frame.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, in a computing system, a plurality of training examples comprising training inputs and training outputs;
   generating a machine learning model and training the machine learning model using the plurality of training examples, wherein during the training of the machine learning model, each training example, of the plurality of training examples, has a corresponding initial weight;
   receiving a particular input for the machine learning model and, using the particular input and the machine learning model, computing a particular output;
   for each training example of the plurality of training examples:
      adjusting a weight of the training example to an adjusted weight that is different from the initial weight that corresponds to that training example;
      after adjusting the weight of the training example to the adjusted weight, generating a retrained machine learning model by retraining the machine learning model based on the training example with the adjusted weight;
      using the particular input and the retrained machine learning model, computing a second output; and
      based on a difference between the particular output and the second output, computing a relative numerical impact value on the particular output for the training example, wherein the relative numerical impact value reflects an importance of the training example on the particular output relative to an importance of the other training examples of the plurality of training examples on the particular output;
   generating training example relevance data comprising identifiers of the plurality of training examples and the relative numerical impact values for the plurality of training examples;
   storing the training example relevance data in the computing system.

2. The method of claim 1:
   wherein adjusting the weight of the training example on the machine learning model comprises setting the adjusted weight of the training example to zero.

3. The method of claim 1:
wherein adjusting the weight of the training example on the machine learning model comprises increasing the weight of the training example using an adjustment value;
wherein computing the relative numerical impact value comprises computing a change in a loss equation for the machine learning model with respect to a change in the adjustment value.

4. The method of claim 1, further comprising:
using the training example relevance data, identifying one or more training examples with relative numerical impact values below a particular threshold value;
removing the identified one or more training examples from the plurality of training examples and retraining the machine learning model with the remaining plurality of training examples.

5. The method of claim 1, further comprising:
using the training example relevance data, identifying a strict subset of the plurality of training examples with relative numerical impact values greater than the relative numerical impact values for the remaining training examples of the plurality of training examples;
generating a display which identifies the strict subset of the plurality of training examples as highest contributors to the particular output.

6. The method of claim 1, further comprising:
using the training example relevance data, identifying one or more training examples with relative numerical impact values below a particular threshold value;
updating the one or more training examples to comprise different training outputs;
retraining the machine learning model using the plurality of training examples including the updated one or more training examples.

7. The method of claim 6, further comprising:
for each of the updated one or more training examples, computing second relative numerical impact values;
determining whether the second relative numerical impact values are below the particular threshold value;
for each of the updated training examples, removing the updated training example only if the second relative numerical impact value for the updated training example is below the particular threshold value.

8. The method of claim 1, further comprising:
using the training example relevance data, identifying one or more training examples with relative numerical impact values below a particular threshold value;
using the one or more training examples and the machine learning model, computing one or more outputs for one or more training inputs of the one or more training examples;
replacing one or more training outputs of the one or more training examples with the computed one or more outputs.

9. A system comprising:
one or more processors;
a memory storing instructions which, when executed by the one or more processors, causes performance of:
storing, in the memory, a plurality of training examples comprising training inputs and training outputs;
generating a machine learning model and training the machine learning model using the plurality of training examples, wherein during the training of the machine learning model, each training example, of the plurality of training examples, has a corresponding initial weight;
receiving a particular input for the machine learning model and, using the particular input and the machine learning model, computing a particular output;
for each training example of the plurality of training examples:
adjusting a weight of the training example to an adjusted weight that is different from the initial weight that corresponds to that training example;
after adjusting the weight of the training example to the adjusted weight, generating a retrained machine learning model by retraining the machine learning model based on the training example with the adjusted weight;
using the particular input and the retrained machine learning model, computing a second output; and
based on a difference between the particular output and the second output, computing a relative numerical impact value on the particular output for the training example, wherein the relative numerical impact value reflects an importance of the training example on the particular output relative to an importance of the other training examples of the plurality of training examples on the particular output;
generating training example relevance data comprising identifiers of the plurality of training examples and the relative numerical impact values for the plurality of training examples;
storing the training example relevance data in the memory.

10. The system of claim 9:
wherein adjusting the weight of the training example on the machine learning model comprises setting the adjusted weight of the training example to zero.

11. The system of claim 9:
wherein adjusting the weight of the training example on the machine learning model comprises increasing the weight of the training example using an adjustment value;
wherein computing the relative numerical impact value comprises computing a change in a loss equation for the machine learning model with respect to a change in the adjustment value.

12. The system of claim 9, wherein the instructions, when executed by the one or more processors, further cause performance of:
using the training example relevance data, identifying one or more training examples with relative numerical impact values below a particular threshold value;
removing the identified one or more training examples from the plurality of training examples and retraining the machine learning model with the remaining plurality of training examples.

13. The system of claim 9, wherein the instructions, when executed by the one or more processors, further cause performance of:
using the training example relevance data, identifying a strict subset of the plurality of training examples with relative numerical impact values greater than the relative numerical impact values for the remaining training examples of the plurality of training examples;
generating a display which identifies the strict subset of the plurality of training examples as highest contributors to the particular output.

14. The system of claim 9, wherein the instructions, when executed by the one or more processors, further cause performance of:
   using the training example relevance data, identifying one or more training examples with relative numerical impact values below a particular threshold value;
   updating the one or more training examples to comprise different training outputs;
   retraining the machine learning model using the plurality of training examples including the updated one or more training examples.

15. The system of claim 14, wherein the instructions, when executed by the one or more processors, further cause performance of:
   for each of the updated one or more training examples, computing second relative numerical impact values;
   determining whether the second relative numerical impact values are below the particular threshold value;
   for each of the updated training examples, removing the updated training example only if the second relative numerical impact value for the updated training example is below the particular threshold value.

16. The system of claim 9, wherein the instructions, when executed by the one or more processors, further cause performance of:
   using the training example relevance data, identifying one or more training examples with relative numerical impact values below a particular threshold value;
   using the one or more training examples and the machine learning model, computing one or more outputs for one or more training inputs of the one or more training examples;
   replacing one or more training outputs of the one or more training examples with the computed one or more outputs.

17. The method of claim 1, wherein computing the relative numerical impact value on the particular output for the training example is based on using a retained machine learning model that is a result of the adjusting of the weight of the training example on the machine learning model.

18. The system of claim 9, wherein computing the relative numerical impact value on the particular output for the training example is based on using a retained machine learning model that is a result of the adjusting of the weight of the training example on the machine learning model.

* * * * *